United States Patent
Boucourt et al.

(10) Patent No.: US 10,969,492 B2
(45) Date of Patent: Apr. 6, 2021

(54) METHOD AND ON-BOARD EQUIPMENT FOR ASSISTING TAXIING AND COLLISION AVOIDANCE FOR A VEHICLE, IN PARTICULAR AN AIRCRAFT

(71) Applicants: LATECOERE, Toulouse (FR); OFFICE NATIONAL D'ETUDES ET RECHERCHES AEROSPATIALES, Palaiseau (FR)

(72) Inventors: Gerard Boucourt, Tolosan (FR); Nicolas Riviere, Tolosan (FR)

(73) Assignees: Latecoere, Toulouse (FR); Office National d'Etudes et Recherches Aerospatiales, Palaiseau (FR)

( * ) Notice: Subject to any disclaimer, the term of this patent is extended or adjusted under 35 U.S.C. 154(b) by 458 days.

(21) Appl. No.: 15/764,095

(22) PCT Filed: Sep. 30, 2016

(86) PCT No.: PCT/EP2016/073423
§ 371 (c)(1),
(2) Date: Mar. 28, 2018

(87) PCT Pub. No.: WO2017/055549
PCT Pub. Date: Apr. 6, 2017

(65) Prior Publication Data
US 2018/0284283 A1    Oct. 4, 2018

(30) Foreign Application Priority Data
Oct. 2, 2015  (FR) .................................. FR1559411

(51) Int. Cl.
*G01S 17/933* (2020.01)
*G01S 17/42* (2006.01)
(Continued)

(52) U.S. Cl.
CPC .......... *G01S 17/933* (2013.01); *G01S 7/4818* (2013.01); *G01S 17/42* (2013.01); *G01S 17/87* (2013.01)

(58) Field of Classification Search
None
See application file for complete search history.

(56) References Cited

U.S. PATENT DOCUMENTS 6,163,372 A * 12/2000 Sallee .................... G01S 17/66
                                                    356/5.1
9,047,771 B1 * 6/2015 Thoreen ................ G08G 5/045
(Continued)

FOREIGN PATENT DOCUMENTS

EP      0566027      10/1993
EP      2386872      11/2011
(Continued)

OTHER PUBLICATIONS

Riviere Nicolas et al: Active imaging systems to perform the strategic surveillance of an aircraft environment in Electro-Optical remote sensing, photonic technologies, and applications, Bellingham, US, vol. 8186, No. 1,Oct. 6, 2011, pp. 1-12 (XP060010209).

*Primary Examiner* — YuQing Xiao
*Assistant Examiner* — Amir J Askarian
(74) *Attorney, Agent, or Firm* — Defillo & Associates; Evelyn A. Defillo

(57) ABSTRACT

The aim of the invention is to provide an architecture of a laser imager having high spatial resolution, compatible with an application installed on board a vehicle, in particular on board an aircraft. For this purpose, the invention proposes the generation of a piece of wide-field laser ranging information by a suitable remote optical system. An example of a piece of equipment (1) according to the invention installed on board an aircraft moving in an environment that is likely to contain obstacles (4), in particular an aircraft on the
(Continued)

ground, includes a laser range finder (11) coupled to an optical fibre (F1) emitting laser pulses (I), which is itself coupled to an optical system providing an interface with the environment (12) via an optical cross-connect (13) coupled to a covered optical fibre bundle, in the form of laser illuminations (Fi). An echo detector (14) detecting echoes of the laser pulses reflected by an obstacle (4) in the environment is connected to a processing unit (15) for processing the echoes (Er), which is itself connected to a central data unit (16) containing data relative to the conditions of movement of the aircraft and to a display system (17) for displaying the obstacle (4) location data.

8 Claims, 4 Drawing Sheets

(51) Int. Cl.
*G01S 17/87* (2020.01)
*G01S 7/481* (2006.01)

(56) References Cited

U.S. PATENT DOCUMENTS

| | | | |
|---|---|---|---|
| 9,791,569 B2 * | 10/2017 | Hughes | G01S 17/46 |
| 10,539,662 B2 * | 1/2020 | Takizawa | G02B 27/646 |
| 2003/0043058 A1 | 3/2003 | Jamieson | |
| 2005/0007257 A1 * | 1/2005 | Rast | G08G 5/065 |
| | | | 340/815.45 |
| 2012/0154785 A1 * | 6/2012 | Gilliland | G01S 17/931 |
| | | | 356/5.01 |
| 2012/0169053 A1 * | 7/2012 | Tchoryk, Jr. | G01W 1/02 |
| | | | 290/44 |
| 2014/0160460 A1 | 6/2014 | Gilliland | |
| 2014/0330454 A1 * | 11/2014 | Purpura | G08G 5/065 |
| | | | 701/3 |
| 2015/0206439 A1 * | 7/2015 | Marsden | G08G 5/045 |
| | | | 701/301 |
| 2015/0269847 A1 | 9/2015 | Knight | |
| 2016/0288923 A1 * | 10/2016 | Hausmann | B64D 45/00 |
| 2019/0349527 A1 * | 11/2019 | Masuda | G03B 13/36 |

FOREIGN PATENT DOCUMENTS

| | | |
|---|---|---|
| FR | 2948463 | 1/2011 |
| WO | WO2012/038662 | 3/2012 |

* cited by examiner

METHOD AND ON-BOARD EQUIPMENT FOR ASSISTING TAXIING AND COLLISION AVOIDANCE FOR A VEHICLE, IN PARTICULAR AN AIRCRAFT

CROSS REFERENCE TO RELATED APPLICATION

This application is a national stage entry of PCT/EP2016/073423 filed Sep. 30, 2016, under the International Convention claiming priority over French Patent Application No. 1559411 filed Oct. 2, 2015.

TECHNICAL FIELD

The invention pertains to a method for aiding rolling and anticollision intended for the movement of a vehicle, in particular of an airplane moving on the ground (taxi phase also called "taxiing") or else other types of vehicle (on-road automobile, ship at sea or railroad train). The invention also pertains to an on-board item of equipment for aiding rolling and anticollision able to implement this method, as well as to an aircraft comprising such on-board equipment.

Conventionally, navigation on the ground (or on the water) depends on the ability to precisely locate the position of the obstacles in the environment of the vehicle. In particular, in the case of airplane taxiing operations in an airport—which constitutes the main, but not exclusive, application of the present invention—one distinguishes: unforeseeable (fixed or mobile) unexpected obstacles and signage objects (markings, panels, buildings, runways, automotive vehicles, other airplanes, personnel, etc.).

In this sector, the pilots of the airplane in the taxi phase receive an aid to rolling on the basis of information about the identification of the unexpected obstacles or signage objects, as well as about the estimation of the distances between the airplane and these obstacles/objects. This information, provided by the analysis of data provided by embedded optoelectronic systems, is particularly useful under degraded meteorological conditions (rain, fog, night, . . . ).

One generally differentiates between systems of passive type comprising stills cameras (so-called visible cameras whose sensor is responsive in the visible and near-infrared band, or thermal cameras whose sensor is responsive in an infrared band far from the visible), and systems of active type using a source of electromagnetic radiation in the radio wave region (radars) or pulsed laser radiation region (lidars). Active systems make it possible to deduce the distance of the obstacles/objects surrounding the airplane by measuring the durations of emission/reception of a pulse (telemetry).

A ground rolling and anticollision aid can then be generated by a digital processing unit which delivers information in respect of distance and position of the obstacles/objects surrounding the airplane, on the basis of data of the optoelectronic system and the integration of diverse parameters: relative speeds, safety distances, forecast trajectories, etc.

PRIOR ART

Amongst the optronics systems, it is appropriate to distinguish those which have a wide field of view, such as cameras and radars, and systems with reduced—or indeed unidirectional—field of view but with high spatial resolution, such as telemetric lidars (pulsed, modulated, . . . ).

Airports are generally equipped with cameras and radars, stationed fixedly, so as to provide ground controllers with overall vision of the zone. Pilots do not have any direct access to this information. When the cameras are onboard the airplanes, their field of view remains limited to about 100° in order to preserve correct resolution. These systems do not make it possible to locate obstacles/objects with sufficient precision by their positions and their distances, or to determine their relative speeds.

Among the systems with high spatial resolution, telemetric lidars making it possible to recover the entire return signal are for example known from patent documents WO 2012/038662 or FR 2 948 463. By suitable processing of this signal, a relevant location and distance information item is then extracted, cleaned of the parasitic echoes due to the particles of the atmosphere (dust, sand, rain, fog, snowflakes, etc.).

In addition to telemetric lidars, there exist laser imagers called "ladars". Patent documents FR 2 948 463 or EP 2 386 872 disclose such ladars.

These imagers consist of a laser emission source combined with a mono-sensor ensuring detection of the return echoes, doing so for various directions of illumination/observation. The 3D reconstruction of a scene is obtained by sweeping the laser beam emitted (ladars are also called "scanner lasers") with for example the use of an electro-optical shutter.

A ladar can also consist of a divergent laser source and a 3D focal plane (matrix of pixels which is synchronized entirely or pixel by pixel with the pulsed source). Each pixel then gives a distance information item.

These high spatial resolution and short/medium/long range systems remain limited in terms of width of field of view (about 30°). When scanner lasers offer kilometric ranges, the spatial resolution is then reduced to a few points per square meter. Moreover, these systems are difficult to embed on account of a lack of compactness, of their mass, of a lack of ocular safety or of robustness.

DISCLOSURE OF THE INVENTION

The invention is aimed at providing a laser imager architecture with high spatial resolution, exhibiting robustness and compactness that are compatible with an application embedded aboard a vehicle, in particular aboard an airplane. With this aim, the invention proposes to formulate a laser telemetry information item of wide field type by a suitable remotely sited combination of optical transmission and splitting.

More precisely, the subject of the present invention is a method for aiding rolling and anticollision of a moving vehicle, in particular of an airplane on the ground, in which an information item in respect of position and distance of obstacles in an environment of the vehicle is obtained, according to a step of emitting laser pulses, by a distributed laser telemetry coupled to illumination fibered optics by transmission of laser pulses, splitting of the pulses and orientation in multiple directions of these pulses defining an aperture of field of illumination of the environment via an optical interface, and then a step of receiving back the laser pulses emitted by detection of echoes reflected by the obstacles, and a step of processing the echoes received linked with information items in respect of movement of the vehicle which are transmitted by a data platform so as to display information items in respect of obstacles location data.

Moreover, the optical system being installed at at least one vehicle end, in particular in a wing tip of an airplane, a complementary telemeter for measuring the end/ground distance in real time, respectively the wing/ground distance in the case of an airplane, is also provided at this end, respectively in a wing tip, so as to correct the fluctuation of this end, respectively of the airfoil.

The method according to the invention can operate by day or at night, in any weather and retains ocular safety.

According to preferred modes of implementation:

during the reception step, the detection of the echoes is carried out in proximity to the optical interface;

during the reception step, the detection of the reflected echoes is carried out after transmission by reception fibered optics of the echoes received, this reception fibered optics being coupled to the optical interface in a similar manner to the illumination fibered optics;

the transmission between the reception of the echoes and the site of their processing is ensured at least partially by conversion of the echoes received into radiofrequency signals and then by reconversion into electrical signals;

the illumination of the field of view carried out by laser telemetry is correlated with a visualization of the field of view carried out by imaging responsive in the visible, near-infrared and far infrared radiation region for both day and night vision.

The invention also pertains to an on-board item of equipment for aiding rolling and anticollision of a vehicle moving in an environment liable to contain obstacles, in particular of an airplane on the ground, and able to implement the method hereinabove.

Such an item of equipment comprises a laser telemeter coupled to at least one optical fiber for emitting laser pulses, itself coupled to an optical system for multiple orientation of the laser pulses via an emission optical splitter coupled, at output, to a bundle of illumination optical fibers distributed spatially so as to cover, via the optical system, a field of illumination of from a few degrees up to 360° in the form of laser illuminations, and a detector of echoes of the laser pulses emitted and then reflected by the obstacles of the environment. This detector is linked with a unit for processing said echoes, itself linked to a data platform for data relating to the conditions of movement of the vehicle in said environment and to a system for displaying obstacles location data.

Moreover, the optical system being installed at at least one vehicle end, in particular in a wing tip of an airplane, a complementary telemeter for measuring the end/ground distance in real time, respectively the wing/ground distance in the case of an airplane, is also provided at this end, respectively in a wing tip, so as to correct the fluctuation of this end, respectively of the airfoil.

According to a particular embodiment, the echoes detector is arranged in proximity to the optical system.

According to another particular embodiment, the reception of the echoes is effected by a bundle of reception optical fibers, distributed spatially over the optical system in a similar manner to the bundle of illumination optical fibers. This bundle of reception optical fibers is optically coupled to a reception optical splitter, acting as echo concentrator, itself coupled to an echo detection housing via a reception optical fiber.

In an advantageous manner, in the case where the vehicle is an airplane comprising in particular a fuselage and wings, the emission optical splitter and, if relevant, the reception optical splitter are integrated either into the fuselage, in particular in an avionics bay, the bundles of illumination optical fibers and of reception optical fibers then being arranged between the wing and the fuselage in a protective conduit, or into each wing of the airplane so that the optical part of the item of equipment is situated in the wing and its signal processing part in the fuselage of the airplane.

Preferably, the optical system consists of lenses or of groups of lenses exhibiting a convergent external face, each lens or group of lenses being coupled to an illumination optical fiber and, if relevant, to a reception optical fiber. In the case where the vehicle is an airplane, this optical system can be arranged at the ends of wings of the airplane.

Advantageously, when the optical system is arranged in a wing tip, a complementary telemeter is also preferably provided in a wing tip so as to measure the wing/ground distance in real time in order to correct the airfoil fluctuation.

Moreover, the transmission of the echoes to the processing unit is carried out either by wired link or by conversion into radiofrequency signals.

Preferably, the laser telemeter is combined with a camera for visualizing the environment, equipped with sensors responsive in visible/near-infrared and far infrared radiation regions for both day and night vision, by means for superimposing the telemetry and image information items.

DESCRIPTION OF THE FIGURES

Other data, characteristics and advantages of the present invention will become apparent on reading the non-limited description which follows, with reference to the appended figures which represent, respectively.

DETAILED DESCRIPTION

Figure 1:
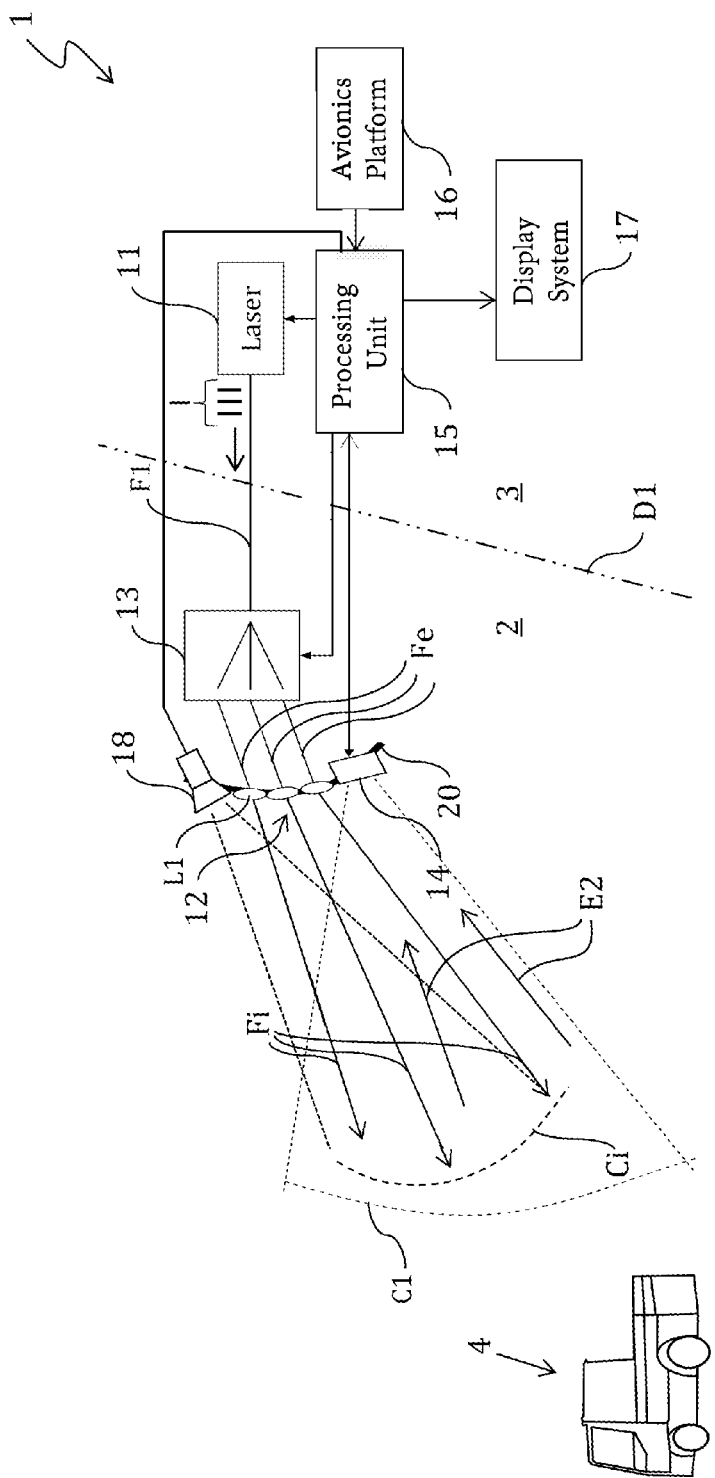
FIG. 1, a schematic lateral view of an exemplary item of equipment for aiding rolling and anticollision according to the invention embedded in a wing and the fuselage of an airplane, detection of the echoes being carried out in a wing tip.
Figure 2A:
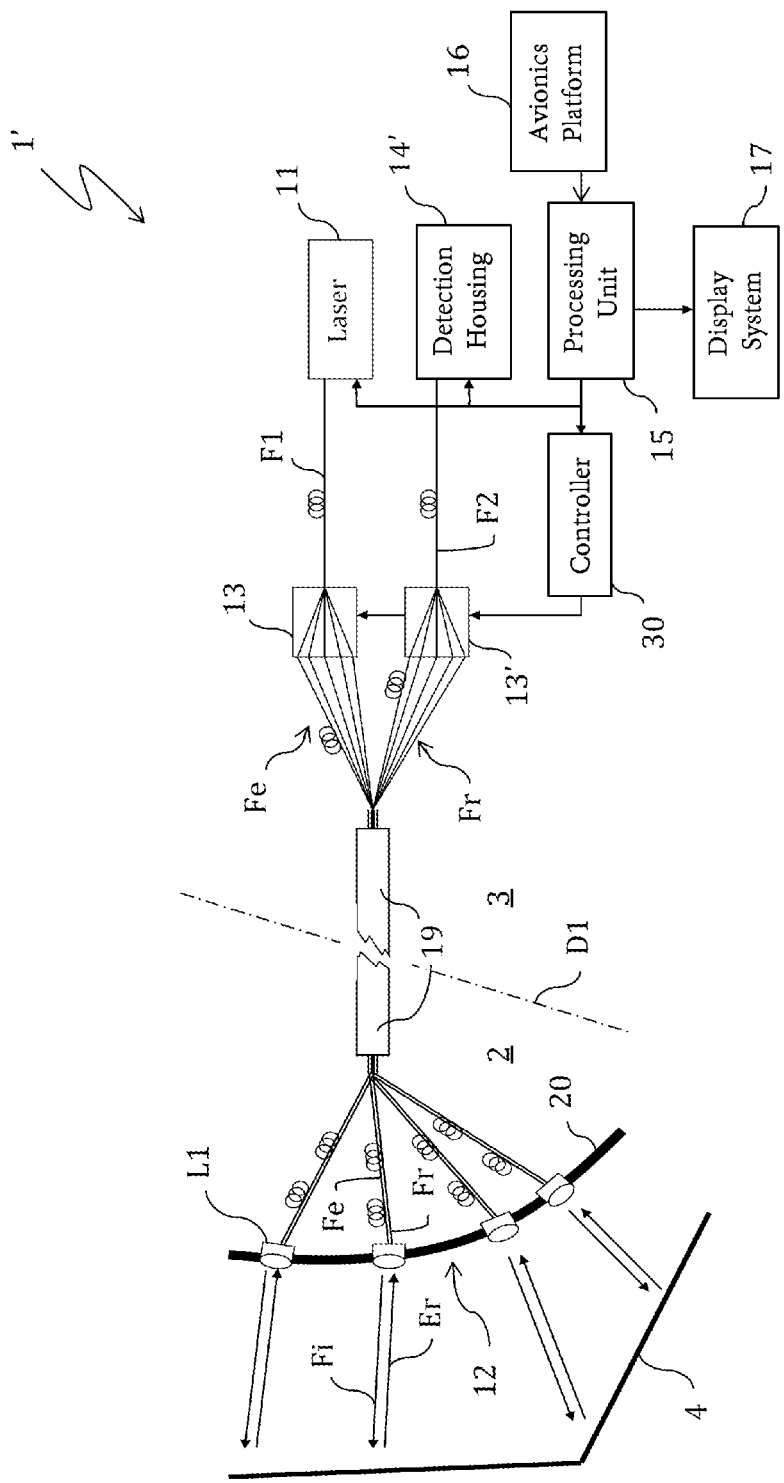
FIGS. 2a and 2b, a schematic lateral view of another exemplary item of equipment for aiding rolling and anticollision according to the invention embedded in a wing and the fuselage of an airplane, with detection of the echoes carried out in the fuselage as well as splitting/concentration of the transmissions of pulses/of echoes carried out either in the wing and the fuselage of the airplane (FIG. 2a) or solely in the wing (FIG. 2b), and FIG. 3, a schematic overall view of an airplane taxiing on the ground fitted, at the ends of its wings, with equipment according to the invention.
Figure 2B:
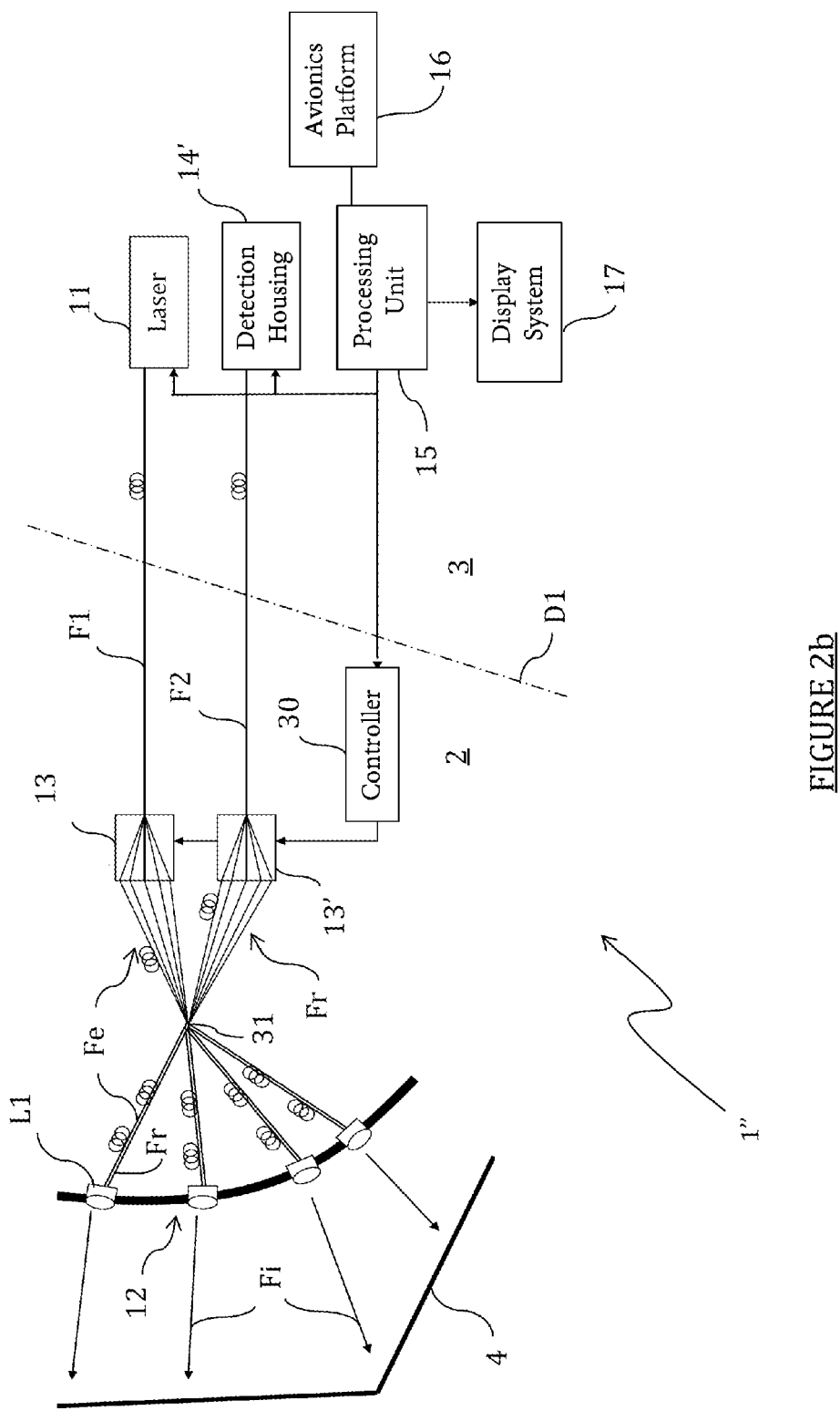

In the figures, two identical or almost-identical elements, for example the lenses illustrated in FIGS. 1, 2a and 2b, are designated by one and the same reference sign, the description of this element being referred to the passage dealing therewith.

With reference to the schematic lateral view of FIG. 1, a first exemplary item of equipment for aiding rolling and anticollision 1 according to the invention is illustrated. This item of equipment 1 is embedded in a wing 2 in respect of the optical part, and inside an airplane fuselage 3, advantageously in the avionics bay, in respect of the signal processing part. The wing 2 and the fuselage 3 are symbolically separated by the straight line D1. In the present case, the airplane is taxiing on the ground a close distance from an unexpected obstacle, a transport trolley 4.

The item of equipment 1 comprises a laser telemeter 11 disposed in the avionics bay 3. This telemeter 11 is coupled to a so-called emission optical fiber F1, for the transmission of the laser pulses "I" emitted by the laser telemeter 11 toward the wing 2 of the airplane. This emission optical fiber F1 is optically coupled to an illumination optical system 12 disposed in a wing tip 20. This optical system 12 carries out a multiple orientation of the laser pulses "I" by way of an emission optical splitter 13 arranged in the wing 2.

At the output of the optical splitter 13, a bundle of illumination optical fibers Fe transmits the pulses "I" in parallel, which will thereafter be emitted by the optical system 12. Accordingly, each illumination optical fiber Fe is coupled to a convergent lens L1 of the optical system 12. This optical system 12 then spatially distributes these pulses "I" in the form of laser illuminations Fi outside of the airplane. The lenses L1 exhibit a convergent external face, are distributed in a wing tip 20 and are oriented so that the set of lenses L1 can cover a wide illumination field Ci. Thus, the illumination field Ci can cover a field of from a few degrees up to 360° in its highest dimension.

An echoes detector 14 is arranged in a wing tip 20 in proximity to the optical system 12, in a manner juxtaposed with this optical system 12 in the example illustrated. This detector 14 receives echoes Er originating from the reflection of the laser illuminations Fi on the obstacles of the environment of the airplane, the transport trolley 4 in the example. The echoes detector 14 possesses a field of view C1 which encompasses the illumination field Ci of the optical system 12.

A unit for digital processing of the echoes 15, arranged in the avionics bay 3, receives the echoes reception signals of the detector 14 through a wired link and converts them into digital data. Alternatively, the transmission is carried out through a suitable radiofrequency link. In this case, the echoes detector converts the echo signals received into radiofrequency signals. A system of antennas for radiofrequency emission/reception between the detector 14 and the processing unit 15 transmits the radiofrequency signals. The processing unit thereafter converts the radiofrequency signals received into digital data.

An analysis of these digital data makes it possible to provide location data in respect of the transporter trolley 4, in terms of position and distance relative to the airplane. Advantageously, this data analysis also comprises a vertical telemeter pointed toward the ground, or any equivalent device, which corrects the real-time position of the wing in relation to the reference plane (the ground in the exemplary embodiment).

This processing unit 15 is also linked to an avionics data platform 16 which provides it with the parameters of movement of the airplane in its environment. The processing unit 15 then transmits information signals to a display system 17 disposed in the cockpit and intended for visualizing the location data—position and distance—of the detected obstacles, the transporter trolley 4 in the example. Advantageously, these information signals provide forecast safety data combining in a software processing the airplane movement data originating from the avionics platform 16 and the obstacle location data originating from the echoes detector 14.

In order to optimize location of the obstacles, the digital processing unit 15 also transmits control signals to the laser telemeter 11 and to the optical splitter 13 as a function of the echoes received by the detector 14, in particular by suitable sweeping of the optical splitter 13.

Advantageously, the laser telemeter 11 is combined with a visualization camera 18. This camera 18, also controlled by the processing unit 15, comprises a sensor responsive in the regions of the visible/near-infrared and far infrared radiation for both day and night vision. Means for superimposing the images visualized by the camera 18 and the 3D information item (the latter arising from the laser illuminations Fi) makes it possible to provide realistic imaging integrating the notion of telemetry of obstacles in the scene.

Another exemplary embodiment of item of equipment for aiding rolling and anticollision is illustrated by the schematic top view of FIG. 2a. In this item of equipment 1', also embedded in the wing 2 and the fuselage avionics bay 3, the echo detection processing is no longer carried out in a wing tip 20 in the detector 14, as in the previous example, but in an echo detection housing 14' inserted in the avionics bay 3.

In this example, the emission optical splitter 13 is sited remotely in the avionics bay 3 and the bundle of illumination optical fibers Fe is concentrated in a conduit 19 so as to transmit the pulses to the wing 2. In proximity to the wing tip 20, the illumination optical fibers are distributed in such a way that each of these fibers Fe is coupled to a lens L1 of the optical system 12 so as to emit a laser illumination Fi in a given direction.

After reflection of the laser illuminations Fi on an obstacle, such as the transport trolley 4 (FIG. 1), the echoes Er are transmitted to a bundle of reception optical fibers Fr, each of these fibers Fr also being coupled to a lens L1. The reception fibers Fr are thus distributed spatially over the optical system 12 in a similar manner to the bundle of illumination optical fibers Fe.

The bundle of reception fibers Fr is grouped together so as to be trunked, via the protective conduit 19, to the avionics bay 3. In a similar manner to the emission, but inversely according to the principle of reversibility of light, the reception fibers Fr are parted on exiting the conduit 19 so as to be coupled optically to a reception optical splitter 13' used as reception optical concentrator. This reception optical splitter 13' is coupled to the echo detection housing 14' via a transmission optical fiber F2.

In this example, the digital processing unit 15 receives obstacle location signals originating from the detection housing 14' and airplane movement data transmitted by the avionics platform 16, and then transmits cross safety information items to the display system 17, as in the previous example. Moreover, the processing unit 15 controls the optical splitters 13 and 13' via a controller 30, in order to synchronize the phases of starting and acquisition of the obstacles location information items as a function of the data received.

According to a variant item of equipment for aiding rolling and anticollision illustrated in FIG. 2b under the reference 1", the emission optical splitter 13 and reception optical splitter 13' as well as the controller 30 are integrated into the airplane wing 2. Under these conditions, the wing 2 shelters the optical part of the item of equipment 1" and the avionics bay 3 the signal processing part of this item of equipment 1". This architecture no longer uses the conduit 19 of the example of FIG. 2a since the splitters 13 and 13' are then sufficiently close to the optical system 12. A spatial distribution pole 31 of the illumination optical fibers Fe and reception optical fibers Fr is provided in place of the conduit 19.

Figure 3:
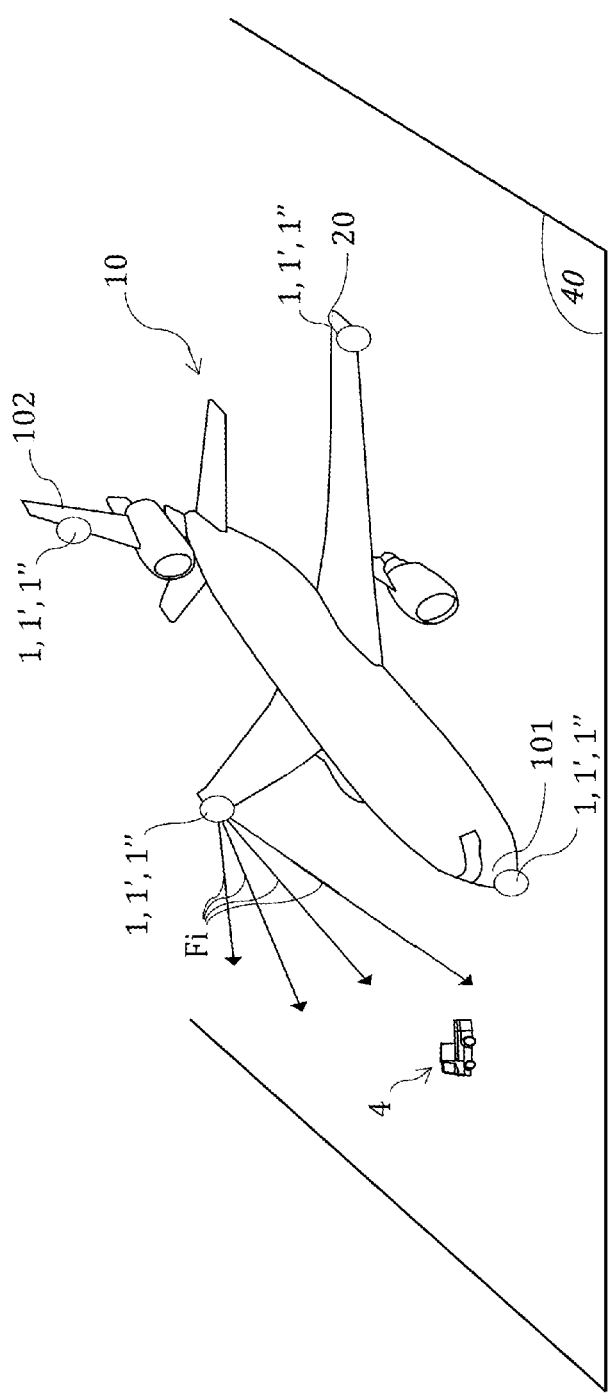

With reference to the perspective view of FIG. 3, the airplane 10 taxiing on the ground 40 is fitted, at the wing tips 20, with embedded items of equipment for aiding rolling and anticollision 1, 1' or 1" according to one of the previous examples. The airplane 10 moving over the ground 40 then locates in its environment and by virtue of these items of equipment 1, 1' or 1" a transporter trolley 4 in the guise of unexpected obstacle, and then provides the pilots with information items in order to correct its path and thus avoid the obstacle 4.

The invention is not limited to the examples described and represented. For example, the item of equipment 1, 1' or 1" and in particular the optical interface 12 can also be implanted in the nose (radome) 101 and/or in the tail fin 102 of the airplane 10 (cf. FIG. 3), or else in another end of the airplane.

The invention claimed is:

1. A method for aiding rolling and anti-collision of a moving vehicle, in particular of an airplane on the ground, in which an information device with respect to a position and a distance of obstacles in an environment of the vehicle is obtained, the method comprising the steps of:
   emitting laser pulses with a distributed laser telemetry coupled to illumination fibered optics,
   optical splitting of the pulses and orientation in multiple directions of the pulses defining an aperture of field of illumination of the environment via an optical interface over which the illumination fibered optics is spatially distributed,
   receiving back the laser pulses emitted in the form of echoes reflected by the obstacles, during which the detection of the reflected echoes is carried out by transmission, by reception fibered optics of the echoes received, and by coupling of the reception fibered optics to the optical interface in a similar manner as the coupling of the illumination fibered optics to the optical interface, and
   processing the received echoes in connection with the information device with respect to a movement of the vehicle which are transmitted by a data platform to display obstacles location data, and with a correction of fluctuation of the optical interface installed at an end of the vehicle, by a complementary telemetry for measuring a ground distance of the end of the vehicle in real time.

2. The method for aiding rolling and anti-collision as claimed in claim 1, wherein the transmission between the reception of the echoes and a site of the processing is ensured at least partially by conversion of the echoes received into radiofrequency signals and then by reconversion into electrical signals.

3. The method for aiding rolling and anti-collision as claimed in claim 1, wherein the illumination of the field carried out by the laser telemetry is correlated with a visualization of the field of view carried out by an imaging responsive in the visible/near-infrared and far infrared radiation regions for both day and night visions.

4. An on-board equipment for aiding rolling and anti-collision of a vehicle moving in an environment liable to contain obstacles, in particular of an airplane on the ground comprising:
   a laser telemeter coupled to at least one optical fiber for emitting laser pulses, the at least one optical fiber being coupled to an optical system for interfacing with the environment via an emission optical splitter coupled, at output, to a bundle of illumination optical fibers distributed spatially over the optical system to cover an illumination field ranging from a few degrees up to 360° in the form of laser illuminations, and an echoes detection housing of the laser pulses emitted and then reflected by the obstacles of the environment, the echoes being received by a bundle of reception optical fibers, distributed over the optical system in a similar matter as the bundle of illumination optical fibers, the bundle of reception optical fibers being coupled optically to a reception optical splitter, acting as echo concentrator, coupled to the echo detection housing via a transmission optical fiber, the echoes detection housing being linked with a unit for processing said echoes, the unit for processing being connected to a data platform to provide data relating to movement conditions of the vehicle in said environment and to a system for displaying obstacles location data and including the optical system being installed at vehicle, a complementary telemeter for measuring a ground distance of the end of the vehicle in real time, in particular a ground distance of a wing of an airplane, is also provided at the end, so as to correct the fluctuation of the end.

5. The on-board equipment for aiding rolling and anti-collision as claimed in claim 4, wherein when the vehicle is an airplane comprising a fuselage and wings, the emission optical splitter and the reception optical splitter are integrated either into the fuselage, the bundles of illumination optical fibers and of reception optical fibers then being arranged between the wing and the fuselage in a protective conduit, or into each wing of the airplane so that the optical part of the item of equipment is situated in the wing and a signal processing part in the fuselage of the airplane.

6. The on-board equipment for aiding rolling and anti-collision as claimed in claim 4, wherein the optical system (12) includes lenses or of groups of lenses exhibiting a convergent external face, each lens or group of lenses being coupled to an illumination optical fiber (Fe) and to a reception optical fiber.

7. The on-board equipment for aiding rolling and anti-collision as claimed in claim 4, wherein the transmission of the echoes to the processing unit is carried out either by wired link or by conversion into radiofrequency signals.

8. The on-board equipment for aiding rolling and anti-collision as claimed in claim 4, wherein the laser telemeter is combined with a visualization camera, of equivalent field of illumination of the environment and sensors responsive in the visible and the near-infrared radiation region for day vision and/or in the far infrared region for night vision by superimposing the fields.

\* \* \* \* \*